(12) United States Patent
Lee

(10) Patent No.: US 7,565,076 B2
(45) Date of Patent: Jul. 21, 2009

(54) LENS MODULE WITH GRATING

(75) Inventor: Chun-Yu Lee, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 407 days.

(21) Appl. No.: 11/309,320

(22) Filed: Jul. 26, 2006

(65) Prior Publication Data

US 2007/0154204 A1 Jul. 5, 2007

(30) Foreign Application Priority Data

Jan. 5, 2006 (CN) .................. 2006 1 0032769

(51) Int. Cl.
*G03B 7/099* (2006.01)
(52) U.S. Cl. .................. 396/276; 359/558; 359/742
(58) Field of Classification Search .................. 396/91, 396/113, 382, 268, 276; 359/558, 652, 742; 348/224.1, 291
See application file for complete search history.

(56) References Cited

U.S. PATENT DOCUMENTS

| | | | | |
|---|---|---|---|---|
| 5,784,656 A | * | 7/1998 | Utagawa | .................. 396/272 |
| 6,157,488 A | * | 12/2000 | Ishii | .................. 359/569 |
| 6,246,522 B1 | * | 6/2001 | Ishii | .................. 359/571 |
| 6,262,846 B1 | * | 7/2001 | Nakai | .................. 359/576 |
| 6,791,754 B2 | * | 9/2004 | Ogawa | .................. 359/565 |
| 6,825,979 B2 | * | 11/2004 | Ogawa | .................. 359/565 |
| 2003/0053212 A1 | | 3/2003 | Ogawa | |
| 2004/0051949 A1 | * | 3/2004 | Ukuda | .................. 359/558 |
| 2004/0105173 A1 | * | 6/2004 | Yamaguchi et al. | .................. 359/793 |
| 2005/0031974 A1 | * | 2/2005 | Fukuhara | .................. 430/30 |

FOREIGN PATENT DOCUMENTS

CN 200320119235.X A 3/2005

\* cited by examiner

*Primary Examiner*—Christopher E Mahoney
*Assistant Examiner*—Autumn Parker
(74) *Attorney, Agent, or Firm*—Steven M. Reiss

(57) ABSTRACT

A lens module (100) includes a barrel (10), a lens (20), an image sensor module (30) and a grating (22). The lens is received in the barrel for focusing optical signals. The image sensor module is installed on an end of the barrel for receiving and transforming the optical signals. The grating is formed on the lens for preventing unnecessary optical signals from being received by the image sensor module.

20 Claims, 4 Drawing Sheets

LENS MODULE WITH GRATING

1. FIELD OF THE INVENTION

The present invention generally relates to lens modules and, more particularly, to a lens module for an optical device such as a microscope, a camera module, a digital camera module used in a portable electronic device, or such like.

2. DESCRIPTION OF RELATED ART

With the ongoing development of microcircuitry and multimedia technologies, digital cameras are now in widespread use. High-end portable electronic devices, such as mobile phones and personal digital assistants (PDAs), are being developed to be increasingly multi-functional. Many of these portable electronic devices are now equipped with a digital camera module. These electronic devices enable consumers to enjoy capturing digital pictures anytime and anywhere. At the same time, the need for digital picture quality has become greater and greater.

In a typical camera module, a lens module is very important to the quality of the pictures captured by the camera module. The lens module typically includes a tubular body and a plurality of lenses. Each lens has a lens portion and a mounting portion. The lens portion is located at a center of the mounting portion. The lenses are coaxially received in the tubular body. The lens portions of the plurality of lenses act together to concentrate a first portion of the image light incident on the lens portions onto an image sensor to capture an image. However, a second portion of image light incident on the mounting portions is also refracted onto the image sensor by the mounting portions. As a result, the second portion of image light interferes with the first portion of image light, thereby reducing the quality of the pictures captured by the image sensor.

Therefore, a new optical lens is desired in order to overcome the above-described shortcomings.

SUMMARY OF THE INVENTION

In a preferred embodiment thereof, a lens module includes a barrel, a lens, an image sensor module and a grating. The lens is received in the barrel for focusing optical signals. The image sensor module is installed on an end of the barrel for receiving and transforming the optical signals. The grating is formed on the lens for preventing unnecessary optical signals from being received by the image sensor module.

Other advantages and novel features will become more apparent from the following detailed description when taken in conjunction with the accompanying drawings.

BRIEF DESCRIPTION OF THE DRAWINGS

Many aspects of the lens module can be better understood with reference to the following drawings. The components in the drawings are not necessarily drawn to scale, the emphasis instead being placed upon clearly illustrating the principles of the lens module. Moreover, in the drawings, like reference numerals designate corresponding parts through out the several views.

DETAILED DESCRIPTION OF THE INVENTION

Figure 1:
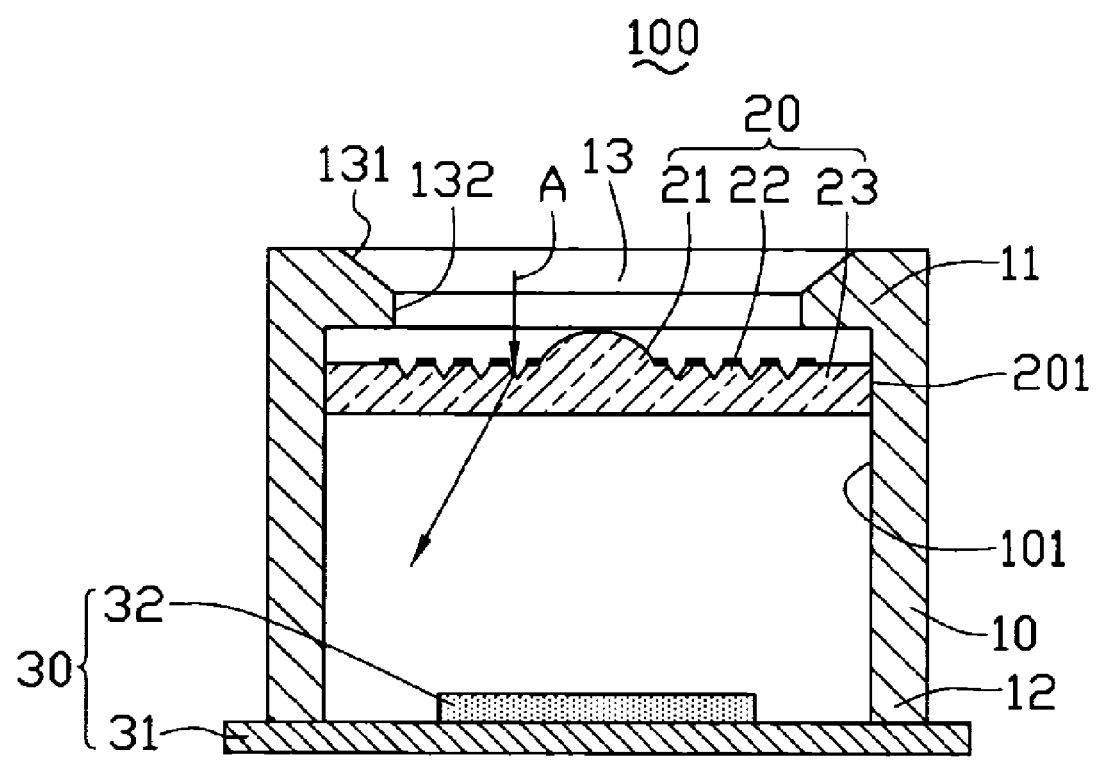
FIG. 1 is a cut-away view of a lens module in accordance with a first embodiment of the present lens module with grating.

Referring now to the drawings in detail, FIG. 1 shows a lens 20 for use with a lens module 100. The lens module 100 is taken here as an exemplary application, for the purpose of describing details of the lens 20 of a preferred embodiment of the present lens module with grating. It is to be understood, however, that the lens 20 could be suitably used in other environments (e.g. in a telescope or in a microscope). As such, although proving particularly advantageous when used in the lens module 100, the lens 20 should not be considered limited in scope solely to an intended use environment of the lens module 100. The lens module 100 includes a barrel 10, the lens 20, and an image sensor module 30. The lens 20 is received in the barrel 10. The image sensor module 30 is installed on an end of the barrel 10.

The barrel 10 is a hollow cylinder in shape and the barrel 10 includes a inner surface 101, a screening end 111 and an installing end 12 positioned opposite to the screening end 11. The barrel 10 defines an opening 13 in a centre of the screening end 11. The opening 13 has a Y-shaped cross section thereby forming a conical sidewall 131 and a cylindrical sidewall 132.

The lens 20 is a substantially round disk in shape. The lens 20 includes an outer surface 201, a lens portion 21, a diffractive grating 22 and a mounting portion 23. The outer surface 201 is shaped corresponding to the shape of the inner surface 101. A diameter of the lens 20 is substantially equal to an inner diameter of the barrel 10 so that the lens 20 is fully received in the barrel 10. The lens portion 21 is a spherical portion formed in a centre of the lens 20. The diffractive grating 22 is formed around the lens portion 21. The mounting portion 23 is a planar portion formed around the diffractive grating 22.

Figure 2:
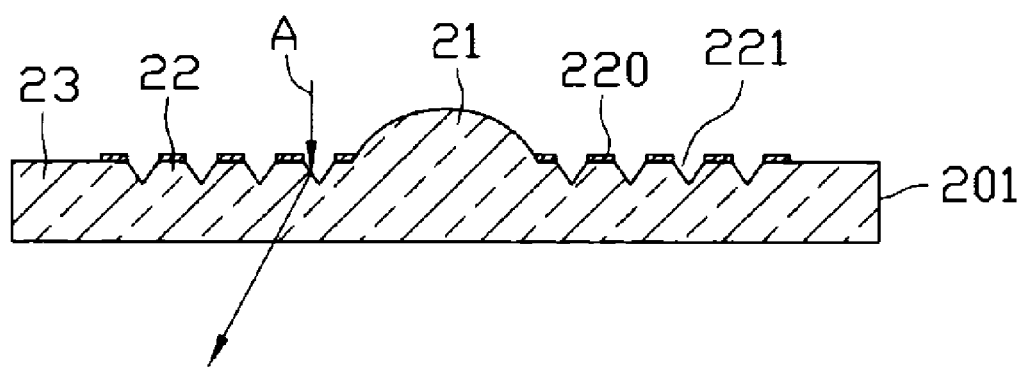
FIG. 2 is an enlarged cut-away view of a lens of the lens module in accordance with the first embodiment of the present lens module with grating.

Also referring to FIG. 2, the diffractive grating 22 includes an opaque film 220 and a plurality of transmitting slots 221. The opaque film 220 is an annular film formed on a surface of the lens 20 and covering an area around the lens portion 21. The diameter of the opaque film 220 is corresponding to the diameter of the cylindrical sidewall 132. All transmitting slots 221 are equidistantly formed on the lens 20. Each transmitting slot 221 is an annular slot formed around the lens portion 21 and through the opaque film 220.

The image sensor module 30 includes a base 31 and an image sensor 32. The base 31 is installed on the installing end 12 of the barrel 10. The image sensor 32 is secured on the base 31 and received in the barrel 10.

In assembly, the lens 20 is inserted into the barrel 10 from the installing end 12. The outer surface 201 cooperates with the inner surface 101, and the lens 20 is secured in the barrel 10 so that the axis of the lens portion 21 of the lens 20 is perpendicular to a radial direction of the barrel 10. Additionally, a plurality of lenses 20 can also be inserted and secured in the barrel 10. The installing end 12 is secured on the base 31. The image sensor 32 is secured on the base 31 and received in the barrel 10. Optical signals coming from the lens 20 are transformed into electronic signals by the image sensor 32.

In use, the lens portion 21 and the diffractive grating 22 are both exposed in the barrel 10. Either the lens portion 21 or the diffractive grating 22 receives incident optical signals. Incident optical signals arriving at the lens portion 21 are focused by the lens portion 21 and are received by the image sensor 32, thus these optical signals are transformed into electronic signals. Incident optical signals that have not been focused (shown as line A) arrive at the diffractive grating 22, these unnecessary incident optical signals are diffracted by the diffractive grating 22. Therefore the incident signals that have not been focused are refracted out the periphery of the image sensor 32, and the image sensor 32 can not receive unnecessary optical signals. In this way quality of the picture captured by the image sensor 32 is improved.

Figure 3:
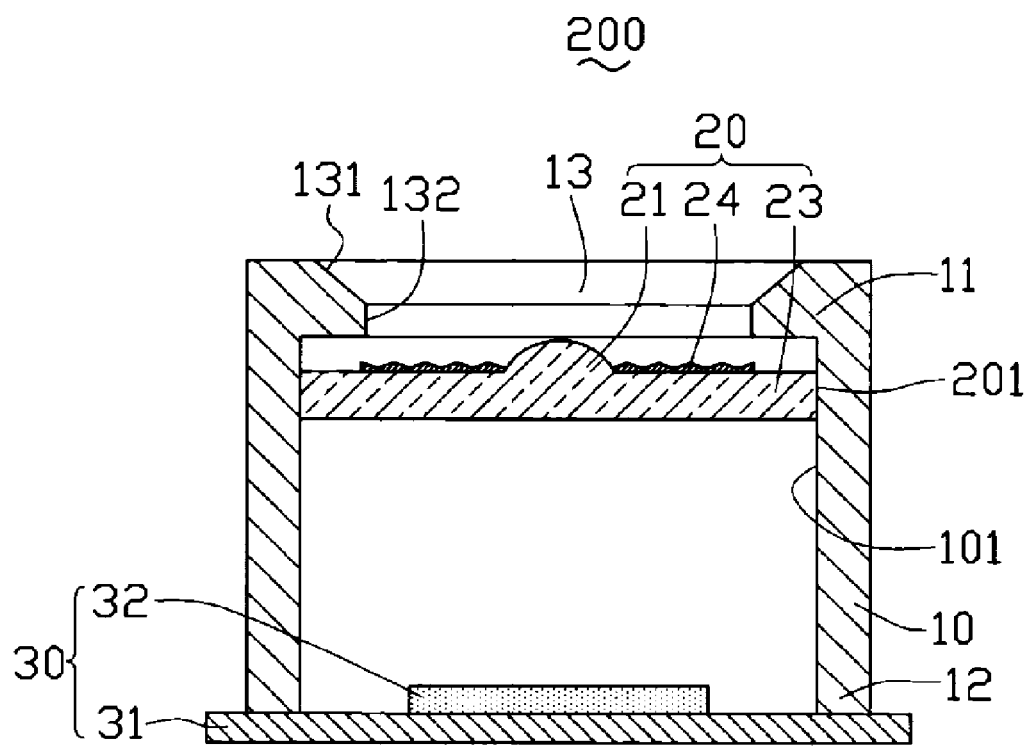
FIG. 3 is a cut-away view of a lens module in accordance with a second embodiment of the present lens module with grating.

Referring to FIG. 3, a lens module 200 according to a second embodiment is provided. All components of the lens module 200 are similar to the lens module 100 except that the diffractive grating 22 of the lens module 100 is replaced by a reflecting grating 24. The reflecting grating 24 is an annular film made of reflexible materials installed on a surface of the lens 20. The reflecting grating 24 covers an area around the lens portion 21, and the mounting portion 23 is defined around the reflecting grating 24. The diameter of the reflecting grating 24 corresponds to the diameter of the cylindrical sidewall 132. The reflecting grating 24 defines a plurality of reflecting slots 241. All reflecting slots 241 are equidistantly formed on the reflecting grating 24. Each reflecting slot 241 is an annular slot formed around the lens portion 21 and has a triangular section, thus a serrated surface is formed on the reflecting grating 24.

Figure 4:
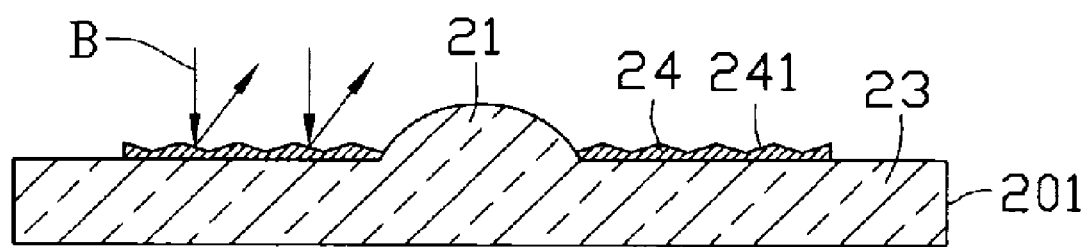
FIG. 4 is an enlarged cut-away view of a lens of the lens module in accordance with the second embodiment of the present lens module with grating.

Assembly of the lens module 200 is similar to assembly of the lens module 100. In use, the lens portion 21 and the reflecting grating 24 are both exposed from the barrel 10. Either the lens portion 21 or the reflecting grating 24 receives incident optical signals. Also referring to FIG. 4, incident optical signals that have not been focused (shown as line B) arrive at the reflecting grating 24, these unnecessary incident optical signals are reflected by the reflecting grating 24. Therefore the incident signals that have not been focused are refracted out the periphery of the image sensor 32, and the image sensor 32 can not receive unnecessary optical signals. In this way quality of the picture captured by the image sensor 32 is improved.

It is to be understood, however, that even though numerous characteristics and advantages of the present lens module with grating have been set forth in the foregoing description, together with details of the structure and function of the lens module with grating, the disclosure is illustrative only, and changes may be made in detail, especially in matters of shape, size, and arrangement of parts within the principles of the lens module with grating to the full extent indicated by the broad general meaning of the terms in which the appended claims are expressed.

What is claimed is:

1. A lens module, comprising:
a barrel;
a lens received in the barrel, the lens including a lens portion formed on a centre of the lens and a grating formed around the lens portion, the lens portion directing image light that is focused by the lens portion toward an image media, the grating substantially preventing any image light that arrives at the grating from reaching the image media.

2. The lens module as claimed in claim 1, wherein the barrel is a cylinder including an inner surface, a screening end and an installing end positioned opposite to the screening end.

3. The lens module as claimed in claim 2, wherein the barrel defines an opening in the centre of the screening end, a conical sidewall and a cylindrical sidewall are formed around the opening.

4. The lens module as claimed in claim 2, wherein the lens includes an outer surface and a mounting portion, the outer surface is shaped corresponding to the shape of the inner surface, and the mounting portion is formed around the grating.

5. The lens module as claimed in claim 1, wherein the grating is a diffractive grating, the grating includes an opaque film and a plurality of transmitting slots; the opaque film is an annular film covering an area around the lens portion, and each transmitting slot is an annular slot formed around the lens portion and through the opaque film.

6. The lens module as claimed in claim 1, wherein the grating is a reflective grating, the reflecting grating is a film made of reflexible materials and covers an area around the lens portion.

7. The lens module as claimed in claim 6, wherein the grating defines a plurality of reflecting slots therein, where each reflecting slot is an annular slot formed around the lens portion and has a triangular section, thus a serrated surface is formed on the grating.

8. The lens module as claimed in claim 2, wherein the image sensor module includes a base and an image sensor, the base is installed on the installing end of the barrel, the image sensor is secured on the base and received in the barrel.

9. A camera module, comprising:
a barrel;
a lens received in the barrel for focusing optical signals;
an image sensor module arranged to receive the optical signals; and
a grating formed on the lens and preventing substantially all optical signals that arrive at the grating from being received by the image sensor module.

10. The camera module as claimed in claim 9, wherein the barrel is a cylinder including an inner surface, a screening end and an installing end positioned opposite to the screening end.

11. The camera module as claimed in claim 10, wherein the barrel defines an opening in the centre of the screening end, a conical sidewall and a cylindrical sidewall are formed around the opening.

12. The camera module as claimed in claim 10, wherein the lens includes an outer surface, a lens portion and an mounting portion; the outer surface is shaped corresponding to the shape of the inner surface, the lens portion is formed on the centre of the lens, the grating is formed around the lens portion, the mounting portion is formed around the grating.

13. The camera module as claimed in claim 12, wherein the grating is a diffractive grating, the grating includes an opaque film and a plurality of transmitting slots; the opaque film is an annular film covering an area around the lens portion, each transmitting slot is an annular slot formed around the lens portion and through the opaque flint.

14. The camera module as claimed in claim 12, wherein the grating is a reflective grating, the grating is a film made of reflexible materials and covers an area around the lens portion.

15. The camera module as claimed in claim 14, wherein the grating defines a plurality of reflecting slots therein, each reflecting lot is an annular slot formed around the lens portion and has a triangular section, thus a serrated surface is formed on the grating.

16. The camera module as claimed in claim 10, wherein the image sensor module includes a base and an image sensor, the base is installed on the installing end of the barrel, the image sensor is secured on the base and received in the barrel.

17. A lens comprising:
a lens portion formed on a centre of lens; and
a grating portion formed around the lens portion which refracts or reflects unfocused optical signals arriving at the grating portion which prevents the unfocused optical signals from interfering with the image capturing or the lens portion.

18. the lens as claimed in claim 17, wherein the lens include a planar mounting portion formed around the grating portion.

19. The lens as claimed in claim 17, wherein the grating portion is a diffractive grating, the grating includes an opaque film and a plurality of transmitting slots; the opaque film is an annular film covering an area around the lens portion, and each transmitting slot is an annular slot formed around the lens portion and through the opaque film.

20. The lens as claimed in claim 17, wherein the grating portion is a reflective grating, the reflecting grating is a film made of reflexible materials and covers an area around the lens portion.

* * * * *